United States Patent [19]
Lubas

[11] Patent Number: 5,952,755
[45] Date of Patent: *Sep. 14, 1999

[54] PERMANENT MAGNET MOTOR ROTOR

[75] Inventor: Michael J. Lubas, Basking Ridge, N.J.

[73] Assignee: Electric Boat Corporation, Groton, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,256

[22] Filed: Mar. 18, 1997

[51] Int. Cl.$^6$ .................................................. H02K 21/12
[52] U.S. Cl. ............................ 310/156; 310/218; 310/261
[58] Field of Search .................................... 310/156, 218, 310/261

[56] References Cited

U.S. PATENT DOCUMENTS

| | | | |
|---|---|---|---|
| 887,521 | 4/1908 | Reist | 310/218 |
| 1,369,765 | 3/1921 | Alexander | 310/218 |
| 2,299,589 | 10/1942 | Reis | 310/156 |
| 2,308,028 | 1/1943 | Rose et al. | 310/156 |
| 2,870,357 | 1/1959 | Vandenberg et al. | 310/218 |
| 3,740,600 | 6/1973 | Turley | 310/194 |
| 4,028,574 | 6/1977 | Canay et al. | 310/269 |
| 4,179,634 | 12/1979 | Burson | 310/153 |
| 4,260,921 | 4/1981 | Silver | 310/156 |
| 4,336,649 | 6/1982 | Glaser | 310/156 |
| 4,354,126 | 10/1982 | Yates | 310/156 |
| 4,464,596 | 8/1984 | Miller et al. | 310/156 |
| 4,480,207 | 10/1984 | Miller et al. | 310/156 |
| 4,482,831 | 11/1984 | Notoras et al. | 310/156 |
| 4,588,914 | 5/1986 | Heyne | 310/156 |
| 4,658,167 | 4/1987 | Popov et al. | 310/156 |
| 5,010,266 | 4/1991 | Uchida | 310/156 |
| 5,063,318 | 11/1991 | Anderson | 310/156 |
| 5,091,668 | 2/1992 | Cuenot et al. | 310/156 |
| 5,371,426 | 12/1994 | Nagate et al. | 310/156 |

*Primary Examiner*—Thomas M. Dougherty
*Assistant Examiner*—B Mullins
*Attorney, Agent, or Firm*—Baker & Botts, L.L.P.

[57] ABSTRACT

A permanent magnet motor rotor arrangement including a rotor core having radial and angular positioning surfaces provides for inexpensive and precise positional control of rotor components.

12 Claims, 6 Drawing Sheets

PERMANENT MAGNET MOTOR ROTOR

BACKGROUND OF THE INVENTION

This invention relates to a permanent magnet motor rotor arrangement which increases motor or generator efficiency and can withstand high impact shock loads and high centrifugal loads. The permanent magnet motor rotor provides for inexpensive and precise positional control of rotor components.

Conventionally the most commonly used integral horsepower motor rotors have a squirrel cage construction and are used in alternating current (AC) induction motors. AC and direct current (DC) generators typically include wound rotors. DC motors usually include a commutator and rotor windings. Each of these motors or generators have rotors which differ significantly from a rotor including permanent magnets. In addition, each of these rotors develop a rotor magnetic field by electrical current flowing through the rotor. As a result, all these rotors are excessively large, less efficient, more difficult to cool and of complex construction.

Heretofore, rotors including permanent magnets utilized curved magnets which were fixed with adhesive to the periphery of the rotor. Other permanent motor rotors, typically much smaller in size, utilized magnets embedded in the steel rotor core. In that case, stacks of rotor laminations which form pole pieces are generally secured to the rotor using threaded fasteners or dovetails. Use of the dovetails or fasteners typically increases rotor cost and adds excessive parts to the rotor assembly.

Unfortunately, precise location of rotor pole pieces in permanent magnet motor and generator rotors is difficult to achieve and as a result such rotors are usually noisy. Such precision is necessary when using the rotor for applications where torque fluctuations and cyclical radial loads must be kept to a minimum. Moreover, the inability to provide precise radial position and angular orientation of rotor parts can degrade overall rotor or generator performance, cause unacceptable vibration levels and reduce efficiency.

In addition, loosening of the rotor assembly can occur during operation due to normal motor or generator vibration. Loosening of parts can degrade performance or even cause mechanical damage to motor or generator parts. Vibration may also loosen and cause failure of adhesive bond lines which can result in release of the permanent magnets installed on the motor rotor. Degraded performance or mechanical damage may result from magnets which are loosened and separate from the rotor.

The use of adhesives or threaded fasteners to retain magnets on the rotor core makes the magnets susceptible to separation from excessive centrifugal or high impact shock loads imposed on the motor rotor. Moreover, motor or generator heating and environmental conditions degrade the integrity of the adhesive used to secure the magnets to the rotor, potentially leading to eventual magnet separation and rotor failure.

To help retain surface or adhesive mounted permanent magnets, a thin retaining cylinder usually of metallic or wound fibrous construction is employed. The use of such a thin retaining cylinder or can has detrimental effects on machine performance and efficiency. In addition the required cylinder thickness for a large or high speed motor or generator makes the use of such a can for these applications impractical.

Permanent magnets installed in conventional rotors, whether embedded therein or affixed with adhesive, are susceptible to damage and/or demagnetization from overheating. Unfortunately, the magnets are directly exposed to heat effects associated with air gap surface losses, eddy current heating and heat associated with mechanical vibrations induced from air gap harmonics. Heating these magnets near their Curie temperature can cause demagnetization and result in performance loss. Moreover, shorts in simple turn-to-turn or phase-to-phase stator windings may produce dramatic heating of magnets installed in conventional rotors and thus lead to demagnetization.

Further, conventional permanent magnet rotors offer little or no protection from magnet damage or demagnetization under severe operating conditions or common motor and generator casualties. The magnets are susceptible to physical damage because they are usually located on, or have at least one side totally exposed to the rotor air gap surface. Accordingly, imposed shock loads, high vibration levels or mechanical failure of some other closely aligned motor or generator part can result in physical impact to the magnets thereby damaging the magnets.

Typically, permanent magnet rotors which utilize embedded magnets allow the pole pieces to bear directly onto the magnets. Since the magnet material is brittle, this precludes the use of these magnets as reliable stress bearing structural members in many applications, particularly where large rotors are required. Moreover, permanent magnet rotors generally use only single magnets to establish rotor poles. As the size of a permanent magnet rotor increases, single magnet configurations are more susceptible to physical damage from bending, torsional and shear stresses because, as previously discussed, these magnets are very brittle and do not contain the physical strength associated with other metallic rotor components.

In addition, the single magnets used to create poles in conventional permanent magnet rotors may become difficult and hazardous to handle as the rotor size increases. Typically, permanent magnet rotors utilize powerful rare earth magnets that have strong magnetic fields. Handling of such physically large magnets, each with a large magnet field requires development of special tooling and procedure to handle the magnets. Working with large magnets in the vicinity of surrounding ferromagnetic material may also pose safety hazards to personnel.

Further, the difficulties in manufacturing and magnetization of large size single magnets limits the size and ratings attainable in conventional pulse modulated motor and generator designs.

SUMMARY OF THE INVENTION

Accordingly, it is an object of the invention to provide a permanent magnet motor rotor which reduces motor or generator size and weight.

It is also an object of the invention to provide a permanent magnet motor rotor which increases motor or generator efficiency.

Another object of the invention is to provide a permanent magnet motor rotor which can withstand high impact shock loads and high centrifugal loads.

An additional object of the invention is to provide a permanent magnet motor rotor which provides for motor operation with minimized electromagnetic torque fluctuations and generator operation with minimized current fluctuations.

A further object of the invention is to provide a permanent magnet motor rotor which can be used in very large size motors or generators.

Another object of the invention is to provide a permanent magnet motor rotor which allows for inexpensive maintenance and easy assembly and disassembly of motor or generator rotor parts.

It is also an object of the invention to provide a permanent magnet motor rotor which provides for inexpensive and reliable precise positional control of installed rotor components.

A further object of the invention is to provide a permanent magnet motor rotor which protects against damage to a motor or generator if a magnet cracks or breaks.

These and other objects of the invention are obtained by providing a permanent magnet motor rotor including a rotor core assembly which has a plurality of pole pieces, a rotor hub having at least two surfaces which engage the pole pieces radially and in the angular direction and a plurality of permanent magnets disposed between the pole pieces.

These objects are also obtained by providing a method of securely positioning pole pieces and permanent magnets in a permanent magnet motor rotor including providing a plurality of pole pieces, providing a rotor hub having at least two surfaces which engage the pole pieces and position the pole pieces radially and in the angular direction and providing a plurality of permanent magnets disposed between the pole pieces.

BRIEF DESCRIPTION OF THE DRAWINGS

Further objects and advantages of the present invention will be more fully appreciated from a reading of the detailed description when considered with the accompanying drawings wherein.

DESCRIPTION OF THE PREFERRED EMBODIMENT

Figure 1:
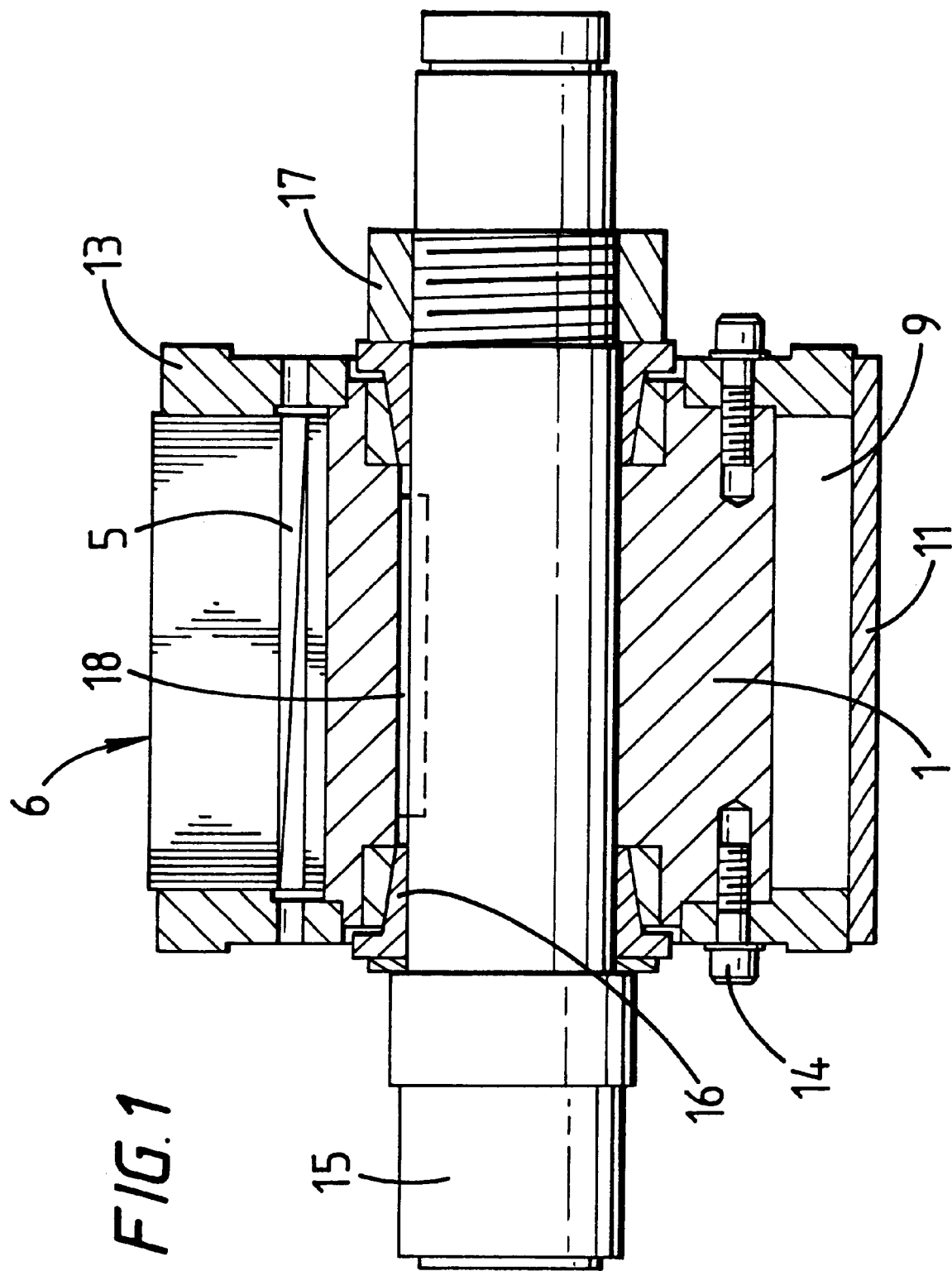
FIG. 1 is a longitudinal sectional view of a shaft and a permanent magnet motor rotor in accordance with the invention.
Figure 2:
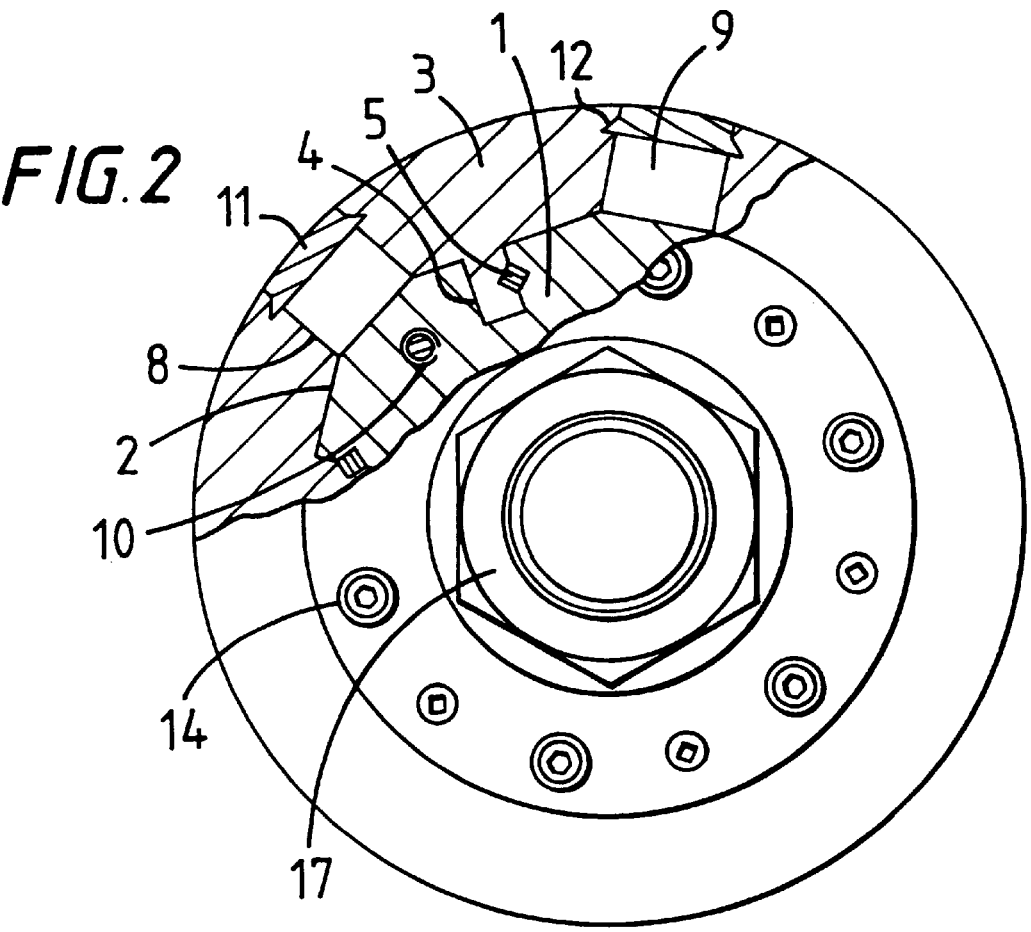
FIG. 2 is an end view partly in section of a permanent magnet motor rotor in accordance with the invention.
Figure 3:
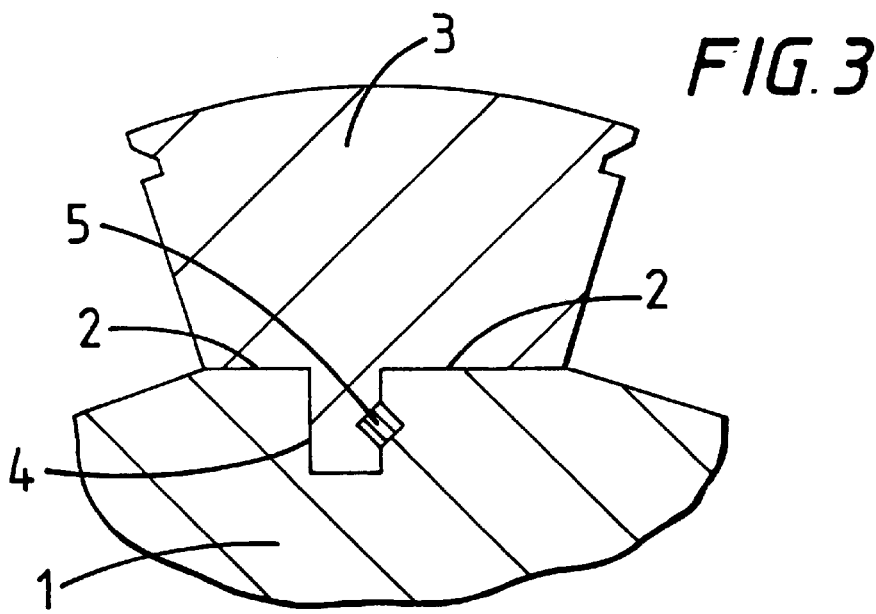
FIG. 3 is an illustration of a pole piece positioned in the permanent magnet motor rotor in accordance with the invention.
Figure 3A:
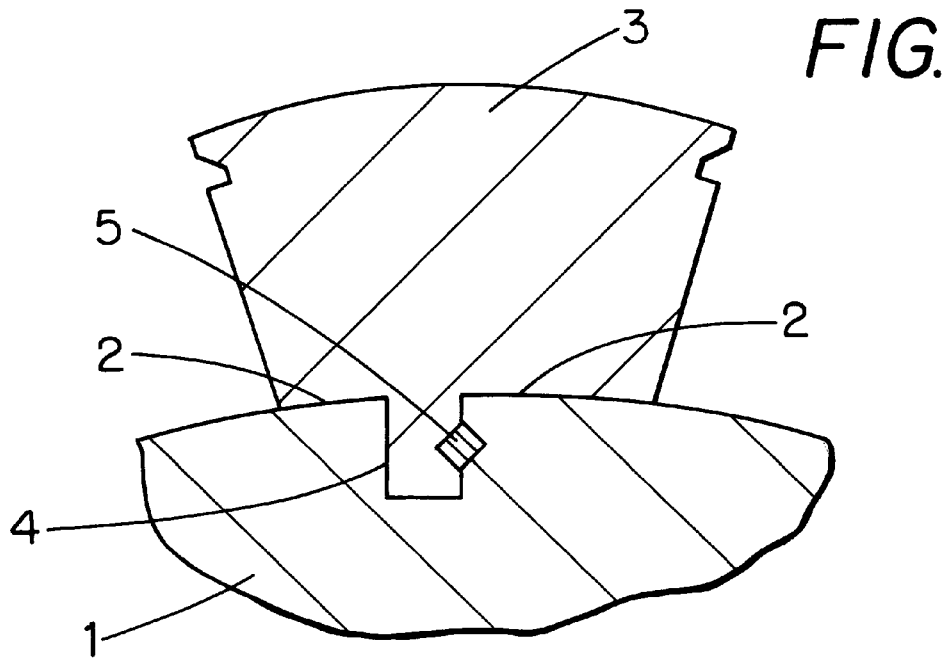
FIG. 3(a) is an illustration of a pole piece positioned in the permanent magnet motor rotor using curved radial positioning surfaces in accordance with the invention.

As shown in the representative embodiment, a rotor hub 1 supports an angularly distributed array of pole pieces 3 and includes two sets of accurate positioning surfaces 2 and 4 for positioning the pole pieces. The rotor hub 1 is preferably composed of a metallic material, for example aluminum, or a non-metallic material, for example ceramic, plastic or a reinforced composite material. The rotor hub may be constructed as a solid piece or structural fabrication with a hollow center in order to reduce rotor weight. The pole pieces may consist of a solid block of ferromagnetic material or may be composed of a stack of laminated segments.

One set of rotor hub positioning surfaces 2 controls the radial position of the rotor pole pieces 3 with respect to the rotor axis. Preferably, the radial positioning surfaces 2 are a series of flat surfaces with faces tangent to an inscribed circle concentric with the rotor axis. In an alternate embodiment, the radial positioning surfaces may be a series of curved surfaces which together form parts of a cylinder concentric with the rotor axis. A second set of positioning surfaces 4 controls the angular orientation of the rotor pole pieces. The positioning surfaces 4 are flat plane surfaces extending parallel to a radial plane which passes both through the centerline of the rotor and through the centerline of the pole pieces 3 which are oriented by the positioning surface 4.

Figure 4A:
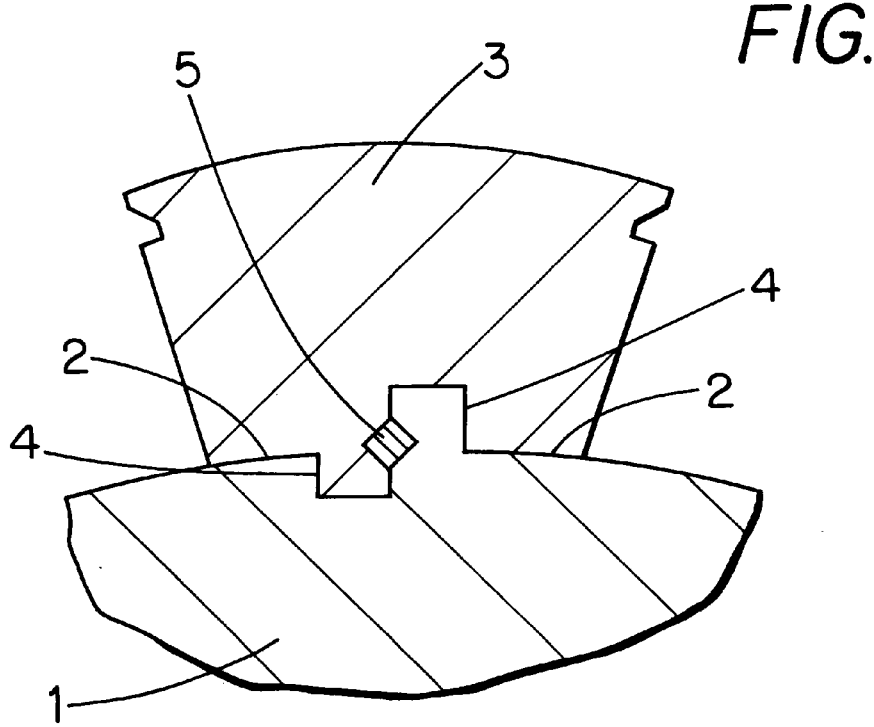
FIG. 4(a) is an illustration of a pole piece positioned in the permanent magnet motor rotor using curved radial positioning surfaces and in which the angular orientation surface of the rotor is located at a lesser radial distance form the center line than the radial position surfaces in accordance with the invention.
Figure 4:
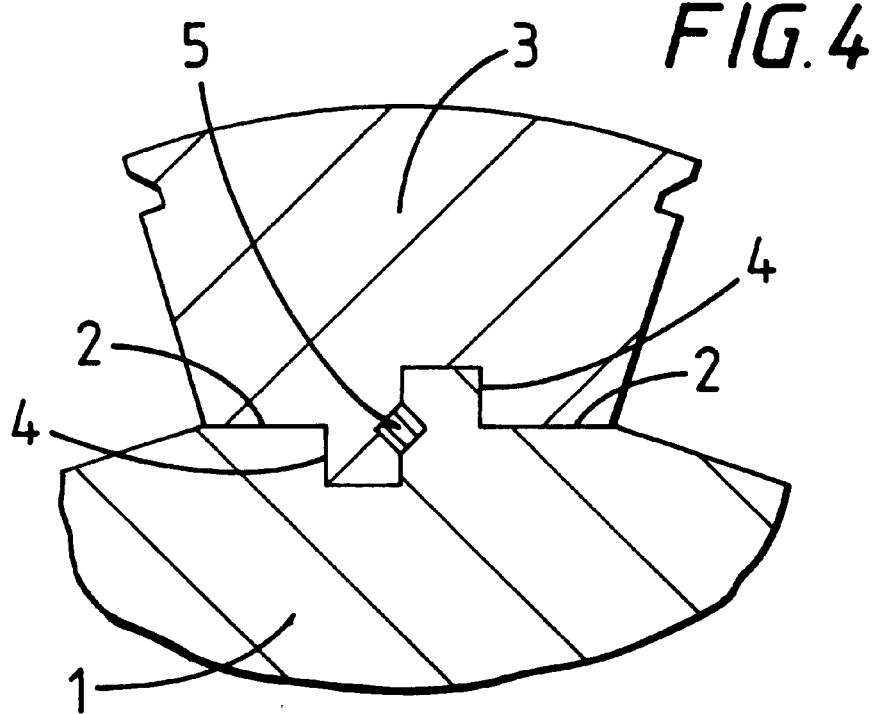
FIG. 4 is an illustration of a pole piece positioned in the permanent magnet motor rotor in accordance with the invention in which the angular orientation surface of the rotor is located at a lesser radial distance from the centerline of the rotor than the surfaces which control the radial position of the pole piece.
Figure 5:
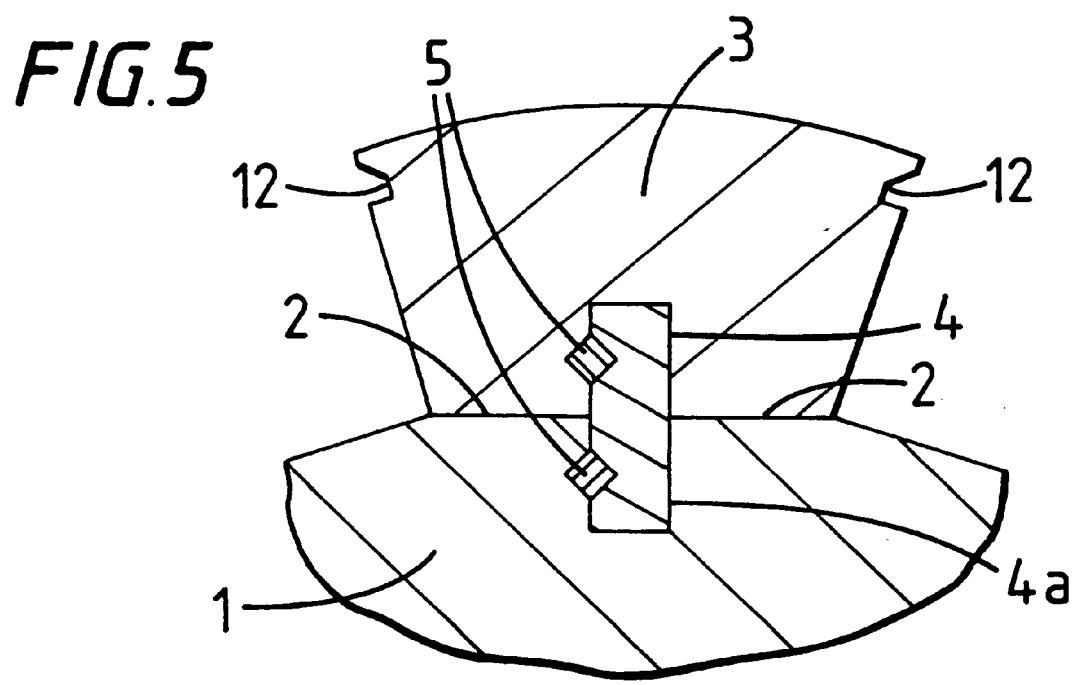
FIG. 5 is an illustration of an alternate arrangement for positioning a pole piece in the permanent magnet motor rotor in accordance with the invention.
Figure 5A:
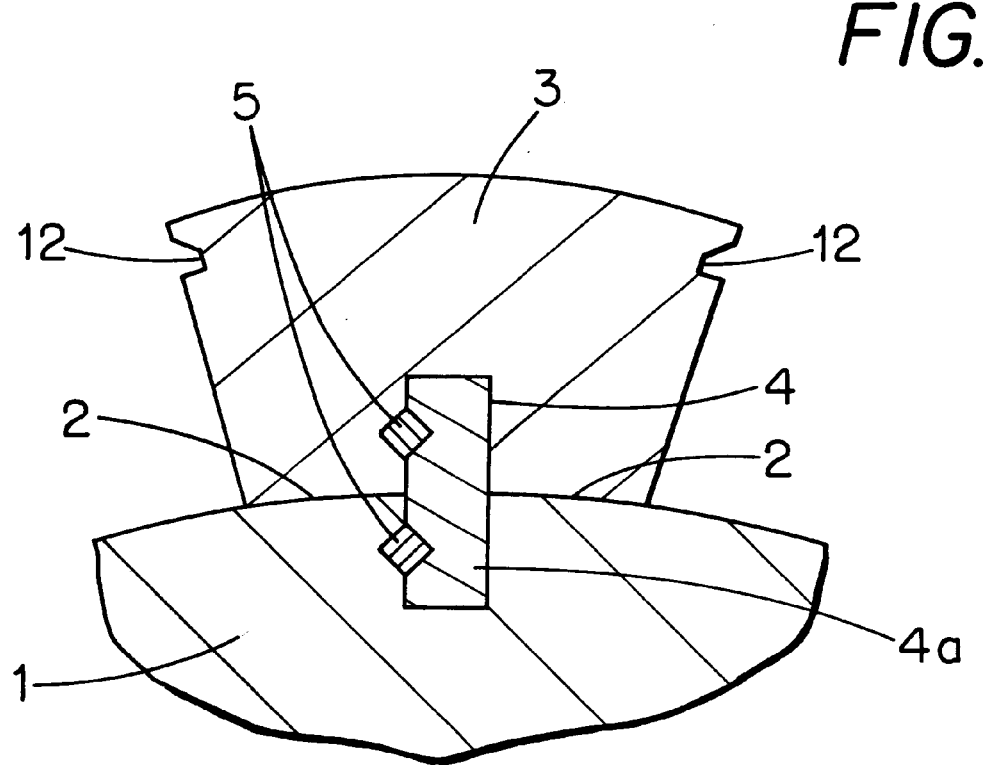
FIG. 5(a) is an illustration of an alternate arrangement for positioning a pole piece including curved radial positioning surfaces in accordance with the invention.

As shown in FIGS. 4 and 5, the surfaces 4 controlling the angular orientation of the pole pieces need not be located at a greater radial distance from the centerline of the rotor than the radial positioning surfaces 2. As illustrated in FIG. 5 the angular orientation surfaces 4 may be formed by projections 4a of rotor core material which engage corresponding slots in the pole pieces 3 and are secured therein by keys 5. The projections 4a may be manufactured as an integral part of the core rotor hub 1 or as an assembly of independent segments that are secured to the core rotor hub 1 as well as to the pole pieces by keys 5.

Figure 6A:
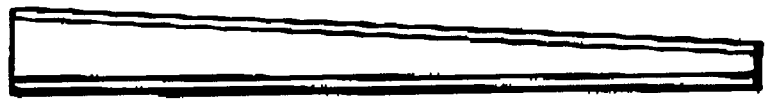
FIGS. 6(a) and 6(b) are side and end views, respectively, showing a representative tapered key for locking a pole piece into a rotor.
Figure 6B:

The pole pieces are installed in the rotor hub by inserting them radially onto the hub core 1. The pole pieces 3 are then locked into position on the hub core 1 by inserting two overlapping multiple part tapered keys 5 of the type shown in FIGS. 6(a) and 6(b) axially from one or both ends of the rotor assembly. When driven into place, the keys 5 produce a wedging action which ensures the correct orientation of pole pieces 3 in relation to the positioning surfaces 2 and 4.

A single magnet or a plurality of smaller magnets 9 may be inserted axially from one or both ends of the rotor core between the pole pieces 3 after the pole pieces are in place on the rotor hub 1. Temporary guide rails (not shown) guide the appropriately sized magnets into the rotor core. Threaded axial holes 10 in the face of the rotor hub core 1 may be used to attach the temporary guide rails.

Generally, the magnets 9 have a rectangular shape with flat sides. In an alternate embodiment, the magnets 9 may have a concave surface which contacts a cylindrical rotor core surface. The relative size of the magnets 9 in relation to the size of the pole pieces 3 may be decreased or increased as necessary to provide desired magnetic field strength when using different magnetic materials. The magnets 9 are sized for a close clearance fit with the adjacent pole piece faces 8 which are parallel plane surfaces. Thus the magnets 9 are held captive in the rotor assembly without being subject to any bearing loads.

Figure 7A:
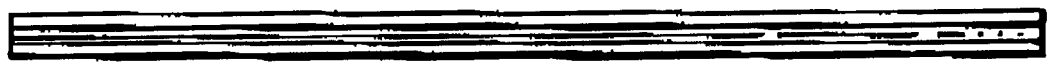
FIGS. 7(a) and 7(b) are side and end views, respectively, along a representative slot wedge for retaining a pole piece in the rotor.
Figure 7B:
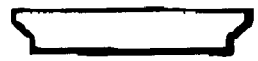

The magnets 9 are restrained from moving radially outwardly due to centrifugal loading by inserting slot wedges 11, shown in FIGS. 7(a) and 7(b) which are made of magnetically inert material, into slots 12 formed in the rotor pole pieces on the opposite sides of the magnets 9. The slot wedges 11 are held captive by mechanically engaging the slots 12 in the rotor pole pieces 3. Alternatively, the rotor pole pieces 3 may be formed with suitable projections to be received in and thereby retain the slot wedges 11. In a further embodiment, the slot wedges 11 may be restrained by end plates 13, shown in FIG. 1, rather than by the slots 12 or by projections in pole pieces. The slot wedges provide physical protection for the magnets 9 during installation of the rotor assembly 1 into the stator assembly and shield the magnets from the air gap surfaces in the assembled motor or generator, thereby reducing the susceptibility of the magnets to demagnetization.

The rotor pole pieces 3 and the magnets 9 are restricted axially by magnetically inert end plates 13 which are attached to the rotor hub 1 with fasteners such as screws 14 at both ends of the rotor shaft. The rotor core assembly 6 is secured on a rotor shaft 15 by tapered metal portions 16 and a shaft mounting locknut 17. Alternatively, the rotor core may be secured to the shaft by shrink fitting it on thereto rather than by using tapered wedge rings 16. A key extending through the shaft and rotor hub precludes relative rotation of the shaft and the rotor. In an alternate embodiment, the rotor hub and the rotor shaft may be fabricated as a single integral unit.

In an alternate embodiment, the outer surfaces of the pole pieces may include circumferential grooves to reduce eddy current losses. In another embodiment the outer surfaces of the pole pieces do not necessarily represent portions of a continuous cylindrical surface. The outer pole piece surfaces may be shaped to control the magnetic flux distribution across the air gap to the motor or generator stator. In a further embodiment, the pole pieces may be positioned so as to be skewed at an angle from a plane which coincides with the shaft centerline. This serves to smooth torque ripple. Another technique for smoothing torque ripple is to skew the stator core rather than the rotor core.

Although the invention has been described herein with respect to specific embodiments, many modifications and variations therein will readily occur to those skilled in the art. Accordingly, all such variations and modifications are included within the intended scope of the invention.

I claim:

1. A permanent magnet motor rotor including a rotor core assembly comprising:

a plurality of angularly distributed solid pole pieces;

a rotor hub having at least two surfaces which engage the pole pieces and position the pole piece radially and in the angular direction, wherein the rotor hub surfaces for positioning the pole pieces in the angular direction include a plurality of flat surfaces and wherein each flat surface is parallel to a radial plane which passes both through the axis of the rotor and through the centerline of a pole piece;

a plurality of permanent magnets disposed between the pole pieces; and a plurality of tapered key means for securing the pole pieces to the rotor hub, the key means being disposed between the pole pieces and the rotor hub.

2. A permanent magnet motor rotor according to claim 1 wherein the rotor hub includes a plurality of flat surfaces for radially positioning the pole pieces and wherein each flat surface is tangential to an inscribed circle concentric with the axis of the rotor hub.

3. A permanent magnet motor rotor according to claim 1 wherein the rotor hub includes a plurality of curved surfaces for radially positioning the pole pieces and wherein the plurality of curved surfaces form part of a cylinder concentric with the axis of the rotor hub.

4. A permanent magnet motor rotor according to claim 1 further comprising a plurality of slot wedge means disposed between adjacent pole pieces to retain the permanent magnets.

5. A permanent magnet motor rotor according to claim 4 wherein the slot wedge means engage mating slots in the pole pieces.

6. A permanent magnet motor rotor according to claim 1 further comprising a plurality of slot wedge means disposed between adjacent pole pieces to retain the permanent magnets.

7. A permanent magnet motor rotor according to claim 6 wherein the slot wedge means engage mating slots in the pole pieces.

8. A method of securely positioning pole pieces and permanent magnets in a permanent magnet motor rotor comprising:

providing a plurality of angularly distributed solid pole pieces, providing a rotor hub having at least two surfaces which engage the pole pieces to position the pole pieces radially and in the angular direction, wherein the rotor hub surfaces for positioning the pole piece in the angular direction include a plurality of flat surfaces and wherein each flat surface is parallel to a radial plane which passes both through the axis of the rotor and through the centerline of the pole piece;

providing a plurality of permanent magnets disposed between the pole pieces, and providing a plurality of tapered key means for securing the pole pieces to the rotor hub, the key means being disposed between the pole pieces and the rotor hub.

9. A method of securely positioning pole pieces according to claim 8 comprising providing a rotor hub including a plurality of flat surfaces for radially positioning the pole pieces and wherein each flat surface is tangential to an inscribed circle concentric with the axis of the rotor hub.

10. A method of securely positioning pole pieces according to claim 8 comprising providing a rotor hub including a plurality of curved surfaces for radially positioning the pole pieces and wherein the plurality of curved surfaces form part of a cylinder concentric with the axis of the rotor hub.

11. A method of securely positioning pole pieces according to claim 8 further comprising providing a plurality of slot wedge means disposed between adjacent pole pieces to retain the permanent magnets.

12. A method of securely positioning pole pieces according to claim 11 comprising providing mating slots in the pole pieces and engaging the mating slots in the pole pieces with the slot wedge means.

* * * * *